US012529726B2

United States Patent
Shrivastava

(10) Patent No.: US 12,529,726 B2
(45) Date of Patent: Jan. 20, 2026

(54) DYNAMIC TARGET STATE OF CHARGE FOR HYBRID VEHICLE CAPACITY ESTIMATION

(71) Applicant: GM Global Technology Operations LLC, Detroit, MI (US)

(72) Inventor: Balin Kumar Shrivastava, Waterford, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 165 days.

(21) Appl. No.: 18/460,888

(22) Filed: Sep. 5, 2023

(65) Prior Publication Data

US 2025/0076391 A1  Mar. 6, 2025

(51) Int. Cl.
*G01R 31/3835* (2019.01)
*B60L 58/12* (2019.01)
*G01R 31/367* (2019.01)
*H02J 7/00* (2006.01)

(52) U.S. Cl.
CPC .......... *G01R 31/3835* (2019.01); *B60L 58/12* (2019.02); *G01R 31/367* (2019.01); *H02J 7/0048* (2020.01)

(58) Field of Classification Search
None
See application file for complete search history.

(56) References Cited

U.S. PATENT DOCUMENTS

| 2010/0036626 | A1* | 2/2010 | Kang | G01R 31/392 |
| | | | | 702/63 |
| 2012/0290234 | A1* | 11/2012 | Schaefer | B60L 58/22 |
| | | | | 320/135 |
| 2015/0367747 | A1* | 12/2015 | Decker | H02J 7/0069 |
| | | | | 320/136 |
| 2017/0285109 | A1* | 10/2017 | Kawamura | G01R 31/392 |
| 2021/0242510 | A1* | 8/2021 | Li | B60L 58/12 |

* cited by examiner

*Primary Examiner* — Jas A Sanghera
(74) *Attorney, Agent, or Firm* — CANTOR COLBURN LLP

(57) ABSTRACT

A vehicle includes a system that performs a method of calculating a capacity of a battery of the vehicle. The system includes a processor configured to operate the vehicle to deplete the battery to reach a target low state of charge, measure a resting low state of charge after allowing the battery to rest for a first rest period after the battery reaches the target low state of charge, operate the vehicle to charge the battery to reach a target high state of charge, measure a resting high state of charge after allowing the batter to rest for a second rest period after the battery reaches the target high state of charge, and calculate the capacity of the battery from the resting low state of charge and the resting high state of charge.

20 Claims, 3 Drawing Sheets

DYNAMIC TARGET STATE OF CHARGE FOR HYBRID VEHICLE CAPACITY ESTIMATION

INTRODUCTION

The subject disclosure relates to determining a health of a battery used in a hybrid vehicle and, in particular, to a system and method for determining a charge capacity for the battery.

The battery is an important component of an automotive vehicle. For a hybrid vehicle, the battery is relied upon to power the vehicle when in an electric mode and to provide ignition at a combustion motor when in a combustion mode. Knowing the health of the battery is an important consideration in maintaining the vehicle in operating condition. Since the battery can be either depleted or charged, depending on the mode of operation of the vehicle, there is no direct method for knowing the state of charge or health of the battery. Accordingly, it is desirable to provide a method for determining a state of charge for a battery used in a hybrid vehicle.

SUMMARY

In one exemplary embodiment, a method of calculating a capacity of a battery of a vehicle is disclosed. The battery is depleted to reach a target low state of charge during operation of the vehicle. The battery is rested for a first rest period after the battery reaches the target low state of charge. A resting low state of charge is determined after the first rest period. The battery is charged to reach a target high state of charge during operation of the vehicle. The battery is rested for a second rest period after the battery reaches the target high state of charge. A resting high state of charge is determined after the second rest period. A capacity of the battery is calculated from the resting low state of charge and the resting high state of charge.

In addition to one or more of the features described herein, the method further includes measuring an accumulated charge on the battery while charging the battery and calculating the capacity of the battery from the resting low state of charge, the resting high state of charge and the accumulated charge.

In addition to one or more of the features described herein, the target low state of charge is at a low end of an operating range of the battery and the target high state of charge is at a high end of the operating range.

In addition to one or more of the features described herein, the method further includes at least one of measuring a first voltage of the battery after the first rest period and determining the resting low state of charge from the first voltage and measuring a second voltage of the battery after the second rest period and determining the resting high state of charge from the second voltage.

In addition to one or more of the features described herein, determining at least one of the resting low state of charge and the resting high state of charge further includes one of using a lookup table that relates state of charge to voltage and using a model equation that relates state of charge to voltage.

In addition to one or more of the features described herein, the method further includes estimating the capacity of the battery based on at least one of a time since a previous update being greater than a selected time criterion, a number of miles since the previous update being greater than a selected mileage criterion, and a variance in values in the previous updates being greater than a variance criterion.

In addition to one or more of the features described herein, the method further includes at least one of running a diagnostic test on the battery based on the estimated capacity, calculating a state of charge for the battery based on the estimated capacity, and sending a signal indicative of a state of health of the battery.

In another exemplary embodiment, a system for calculating a capacity of a battery of a vehicle is disclosed. The system includes a processor configured to operate the vehicle to deplete the battery to reach a target low state of charge, measure a resting low state of charge after allowing the battery to rest for a first rest period after the battery reaches the target low state of charge, operate the vehicle to charge the battery to reach a target high state of charge, measure a resting high state of charge after allowing the batter to rest for a second rest period after the battery reaches the target high state of charge, and calculate the capacity of the battery from the resting low state of charge and the resting high state of charge.

In addition to one or more of the features described herein, the processor is further configured to measure an accumulated charge on the battery while charging the battery and calculate the capacity of the battery from the resting low state of charge, the resting high state of charge and the accumulated charge.

In addition to one or more of the features described herein, the processor is configured to set the target low state of charge at a low end of an operating range of the battery and set the target high state of charge at a high end of the operating range.

In addition to one or more of the features described herein, the processor is further configured to perform at least one of measuring a first voltage of the battery after the first rest period and determining the resting low state of charge from the first voltage and measuring a second voltage of the battery after the second rest period and determining the resting high state of charge from the second voltage.

In addition to one or more of the features described herein, the processor is further configured to determine at least one of the resting low state of charge and the resting high state of charge using one of a lookup table that relates state of charge to voltage and a model equation that relates state of charge to voltage.

In addition to one or more of the features described herein, the processor is further configured to estimate the capacity of the battery based on at least one of a time since a previous update being greater than a selected time criterion, a number of miles since the previous update being greater than a selected mileage criterion, and a variance in values in the previous updates being greater than a variance criterion.

In addition to one or more of the features described herein, the processor is further configured to perform at least one of running a diagnostic test on the battery based on the estimated capacity, calculating a state of charge for the battery based on the estimated capacity, and sending a signal indicative of a state of health of the battery to an operator.

In yet another exemplary embodiment, a vehicle is disclosed. The vehicle includes a battery and a processor. The processor is configured to operate the vehicle to deplete the battery to reach a target low state of charge, measure a resting low state of charge after allowing the battery to rest for a first rest period after the battery reaches the target low state of charge, operate the vehicle to charge the battery to reach a target high state of charge, measure a resting high state of charge after allowing the battery to rest for a second rest period after the battery reaches the target high state of charge, and calculate the capacity of the battery from the resting low state of charge and the resting high state of charge.

In addition to one or more of the features described herein, the processor is further configured to measure an accumulated charge on the battery while charging the battery and calculate the capacity of the battery from the resting low state of charge, the resting high state of charge and the accumulated charge.

In addition to one or more of the features described herein, the processor is configured to set the target low state of charge at a low end of an operating range of the battery and set the target high state of charge at a high end of the operating range.

In addition to one or more of the features described herein, the processor is further configured to perform at least one of measuring a first voltage of the battery after the first rest period and determining the resting low state of charge from the first voltage, and measuring a second voltage of the battery after the second rest period and determining the resting high state of charge from the second voltage.

In addition to one or more of the features described herein, the processor is further configured to determine at least one of the resting low state of charge and the resting high state of charge using one of a lookup table that relates state of charge to voltage and a model equation that relates state of charge to voltage.

In addition to one or more of the features described herein, the processor is further configured to estimate the capacity of the battery based on at least one of a time since a previous update being greater than a selected time criterion, a number of miles since the previous update being greater than a selected mileage criterion, a variance in values in the previous updates being greater than a variance criterion.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
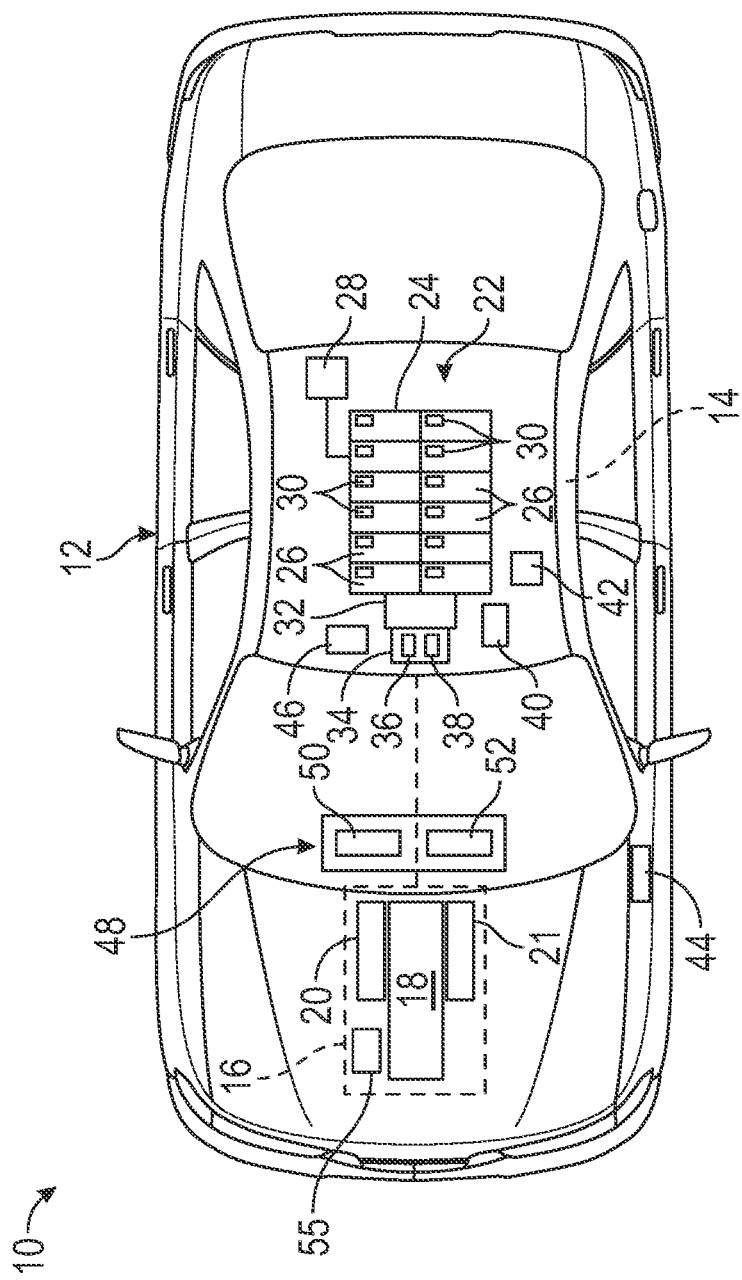
FIG. 1 shows an embodiment of a vehicle, in an illustrative embodiment.

The following description is merely exemplary in nature and is not intended to limit the present disclosure, its application or uses. It should be understood that throughout the drawings, corresponding reference numerals indicate like or corresponding parts and features.

In accordance with an illustrative embodiment, FIG. 1 shows an embodiment of a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 is a hybrid vehicle that includes a combustion engine assembly 18 and at least one electric motor assembly. For example, the propulsion system 16 includes a first electric motor 20 and a second electric motor 21. The first electric motor 20 and second electric motor 21 may be configured to drive wheels on opposing sides of the vehicle 10. Any number of motors positioned at various locations may be used.

The vehicle 10 includes a battery system 22, which may be electrically connected to the first electric motor 20 and second electric motor 21 and/or other components, such as vehicle electronics. The battery system 22 may be configured as a rechargeable energy storage system (RESS).

In an embodiment, the battery system 22 includes a battery assembly such as a high voltage battery pack 24 having a plurality of battery modules 26. Each of the battery modules 26 includes a number of individual cells (not shown). The battery system 22 may also include a monitoring unit 28 (e.g., RESS controller) configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

The battery system 22 is electrically connected to a direct current (DC)-DC converter module 32 and an inverter module 34. The inverter module 34 (e.g., a traction power inversion unit or TPIM) converts direct current (DC) power from the battery assembly to three-phase alternating current (AC) power to drive the motors. In an embodiment, the inverter module 34 includes a first inverter 36 connected to the first electric motor 20, and a second inverter 38 connected to the second electric motor 21.

The battery system 22 may also be connected to other vehicle components or systems. For example, the battery system 22 is connected to an auxiliary power module (APM) 40, which controls power output to components such as a heating system. The APM 40 can be used to supply power from the battery system 22 for heating the occupant compartment 14.

The vehicle 10 may include a charging system that can be used to charge the high voltage battery pack 24 and/or used for supplying power from the high voltage battery pack 24 to charge another energy storage system (e.g., vehicle-to-vehicle charging). The charging system includes an onboard charging module (OBCM) 42 that is electrically connected to a charge port 44.

In an embodiment, the vehicle 10 includes a hybrid operating system 55 configured to control operation of the vehicle 10, including controlling a selection and operation of the combustion engine assembly 18 and the at least one electric motor assembly. The hybrid operating system 55 is in communication with and receives data from the monitoring unit 28. The hybrid operating system 55 includes a processing device or processor, which may be any suitable processor, such as the monitoring unit (e.g., RESS controller) 28, the OBCM 42 or a dedicated controller 46. The hybrid operating system 55 or processor can be used to perform various operations disclosed herein for determining or estimating a charge capacity of a battery of the vehicle.

The vehicle 10 also includes a computer system 48 that includes one or more processing devices 50 and a user interface 52. The various processing devices and units may communicate with one another via a communication device or system, such as a controller area network (CAN) or transmission control protocol (TCP) bus.

Figure 2:
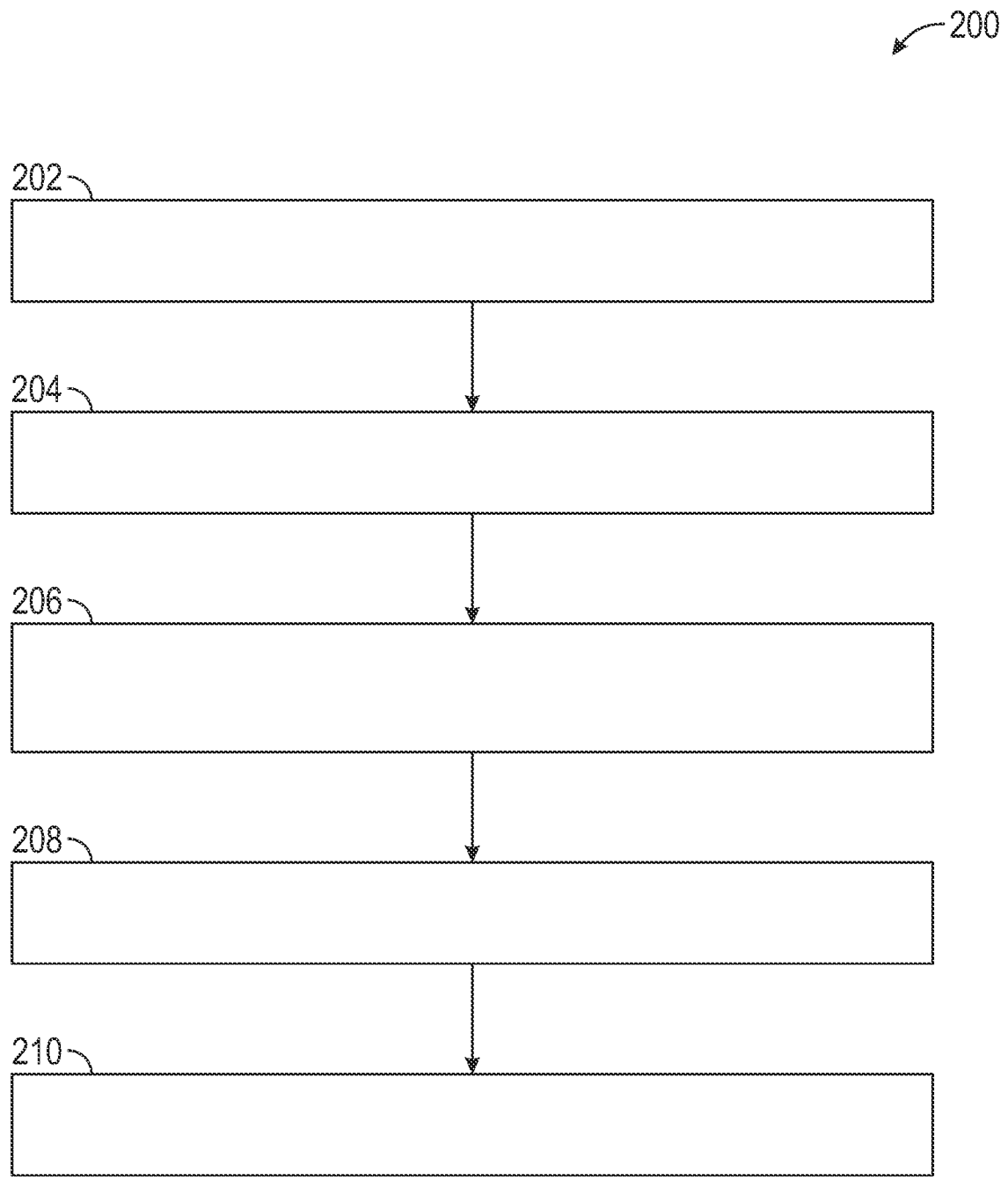
FIG. 2 shows a flowchart illustrating a method for determining a charge capacity for the battery system of the vehicle.

FIG. 2 shows a flowchart 200 illustrating a method for determining a charge capacity for the battery system 22 of the vehicle 10. In box 202, the battery is depleted until the state of charge of the battery reaches a target low state of charge ($SOC_{TL}$). The $SOC_{TL}$ is selected to be an SOC at a low end of an operating range of the battery system 22. The battery system 22 is depleted through operation of the vehicle 10, such as by driving the vehicle in an electric mode of operation. In box 204, a resting low state of charge ($SOC_{RL}$) is recorded after the battery system 22 is allowed to rest for a first rest period. In box 206, the battery is charged until the SOC reaches a target high state of charge ($SOC_{TH}$). The $SOC_{TH}$ is selected to be an SOC at a high end of an operating range of the battery system 22. The battery is charged through operation of the vehicle 10, such as by driving the vehicle in the combustion mode, in which the combustion engine assembly 18 charges the battery. An accumulated charge at the battery is measured during the charging operation. In box 208, a resting high state of charge ($SOC_{RH}$) is recorded after the battery system 22 is allowed to rest for a second rest period. In box 210, the battery capacity is determined from the resting low SOC value ($SOC_{RL}$) and the resting high SOC value ($SOC_{RH}$) as well as the accumulated charge measured while charging the battery.

Figure 3:
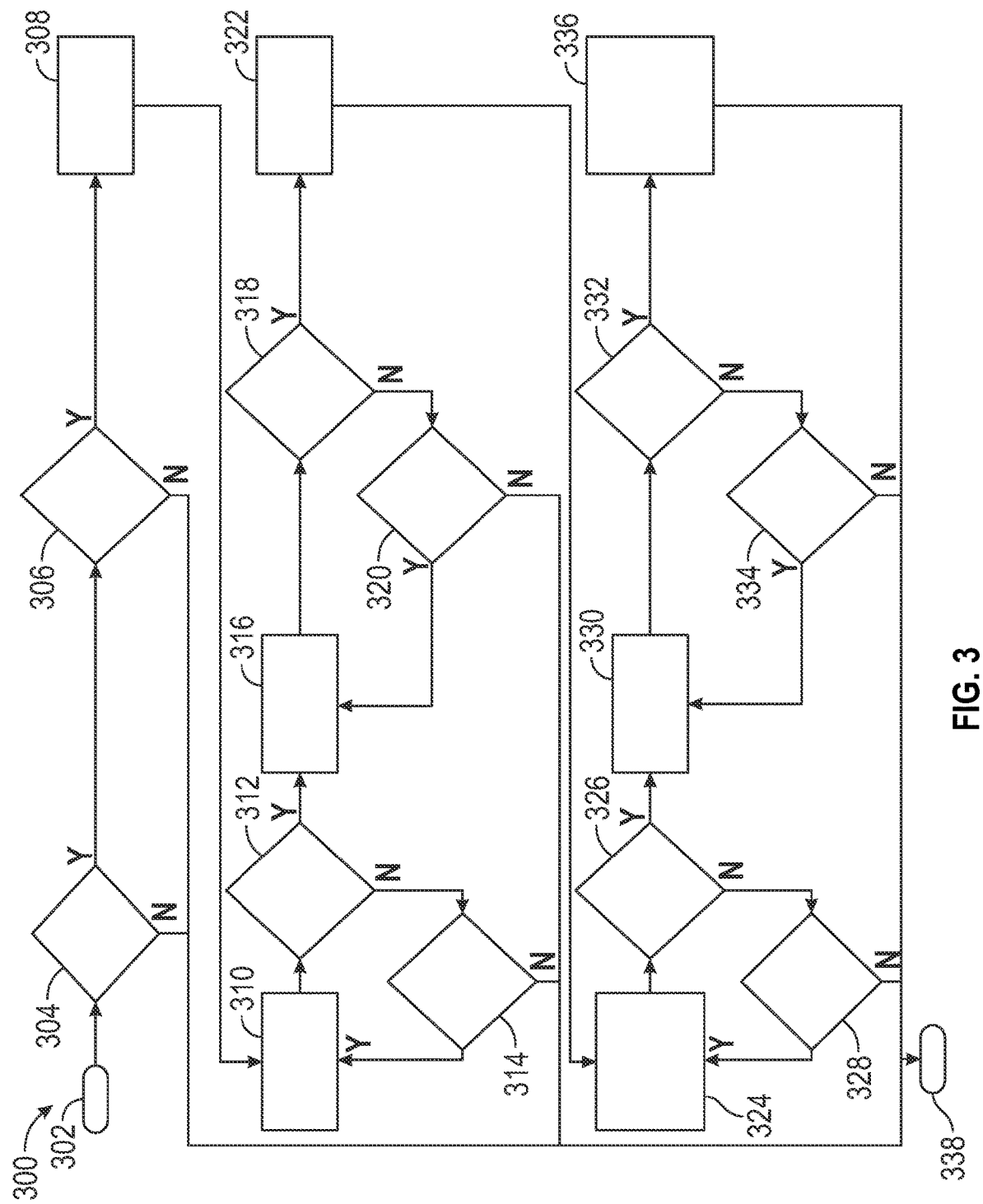
FIG. 3 shows a detailed flowchart of a method for estimating the capacity of the battery system, in an embodiment.

FIG. 3 shows a detailed flowchart 300 of a method for estimating the capacity of the battery system 22, in an embodiment. The method starts in box 302. In box 304, the processor determines whether an update to the estimated capacity of the battery is needed, based on one or more criteria. For example, the processor can start a new estimation procedure when the amount of time since the last update is greater than a selected time criterion. In another example, the processor can start a new estimation procedure when the number of miles since the last update is greater than a selected mileage criterion. In yet another example, the processor can start a new estimation procedure when a variance of charge capacities calculated from previous updates is greater than a selected variance criterion. In box 304, if an update is not needed, the method proceeds to box 338 where the method ends. If an update is needed, the method proceeds to box 306.

In box 306, the drive mode of the vehicle is determined. If the drive mode is not appropriate for performing the capacity update (i.e., a sport mode or performance mode), the method proceeds to box 338 at which the method ends. If the drive mode is appropriate for performing the capacity upper (i.e., normal driving), the method proceeds to box 308.

In box 308, the processor sets a target low state of charge ($SOC_{TL}$). The $SOC_{TL}$ is set at a lower end of a usable SOC range for the battery. As an example, the $SOC_{TL}$ can be 30% of the battery charge capacity.

In box 310, the battery is depleted with the aim of achieving the $SOC_{TL}$. The battery is depleted while the vehicle is being driven, typically using one of the first electric motor 20 and a second electric motor 21. In box 312, the actual SOC is compared to the $SOC_{TL}$. If the $SOC_{TL}$ has been not reached, the method proceeds to box 314. At box 314, the drive mode of the vehicle is checked. If the drive mode is not appropriate for performing the capacity update, the method proceeds to box 338 at which the method ends. Otherwise, if the drive mode is appropriate, the method proceeds to box 310. Returning to box 312, if $SOC_{TL}$ has been reached, the method proceeds to box 316.

In box 316, the battery is maintained at the low target SOC ($SOC_{TL}$) until a key-off event is received to turn off the vehicle. In box 318, the battery is allowed to rest for a first rest period, after which a value for a resting low battery SOC ($SOC_{LR}$) is determined. In various embodiments, the first rest period can be between 1-3 hours. A first voltage of the battery is measured after the first rest period and $SOC_{LR}$ is determined using the first voltage. In an embodiment, the $SOC_{RL}$ can be determined using the measured voltage and a lookup table that relates voltage to SOC. In alternate embodiments, other methods can be used to calculate $SOC_{RL}$ from the first voltage, including, equations, battery models, etc.

If, at box 318, a resting low battery SOC has not been determined, the method proceeds to box 320. If the vehicle is not in the appropriate mode (i.e., the resting mode), the method proceeds to box 338, where the method ends. Otherwise, the method proceeds to box 316. Returning to box 318, once the resting low battery SOC is determined, the method proceeds to box 322.

In box 322, a high target SOC ($SOC_{TH}$) is set. The $SOC_{TH}$ can be set on key-up (i.e., when the vehicle is turned on). The $SOC_{TH}$ is set at a high end of a usable range of the battery. As an example, the $SOC_{TH}$ can be 70% of the battery capacity.

In box 324, the battery is charged with the aim of achieving the high target SOC ($SOC_{TH}$). The battery is charged while the vehicle is being driven, typically using the combustion engine assembly 18. While the battery is being charged, the processor calculates an accumulated pack charge $Q_{Accum}$. In one embodiment, the accumulated pack charge is calculated using an iterative process, such as shown in Eq. (1).

$$Q_{Accum}(k) = Q_{Accum}(k-1) + (I * \Delta t)/3600 \qquad \text{Eq. (1)}$$

where $Q_{Accum}$ is an accumulated pack charge (in amp-hours), I is a current (in Amps) through the battery or battery pack, and t is time (in seconds). The accumulated charge at a time step k is calculated based on the accumulated charge at a previous time step k−1.

In box 326, a decision is made whether $SOC_{TH}$ has been achieved. If $SOC_{TH}$ has been not reached, the method proceeds to box 328. At box 328, the drive mode of the vehicle is checked. If the drive mode is not appropriate for the performing the capacity update (i.e., if the mode is not normal driving), the method proceeds to box 338 where the method ends. Otherwise, if the drive mode is appropriate, the method proceeds to box 324. Returning to box 326, if $SOC_{TH}$ has been reached, the method proceeds to box 330.

In box 330, the processor maintains the SOC of the battery at or near the high target SOC until a key off command is received, turning off the vehicle.

In box 332, the battery system 22 is allowed to rest and for a second rest period and a value for a resting high battery SOC ($SOC_{RH}$) is determined. In various embodiments, the second rest period can be between 1-3 hours. A second voltage of the battery is measured after the second rest period and the $SOC_{RH}$ is determined based on the second voltage. In an embodiment, the $SOC_{RH}$ can be determined based on the second voltage and a lookup table that relates voltage to SOC. In alternate embodiments, other methods can be used to calculate $SOC_{RH}$ from the second voltage, including, equations, battery models, etc.

If, at box 332, a resting high battery SOC has not been determined, the method proceeds to box 334. If, at box 334, the vehicle is not in the appropriate mode (i.e., the resting mode), the method proceeds to box 338, where the method ends. Otherwise, the method proceeds to box 330. Returning to box 332, once the resting high battery SOC is determined, the method proceeds to box 336.

In box 336, an estimated capacity of the battery is calculated. The estimated capacity can be calculated based on the resting low state of charge ($SOC_{RL}$), the resting high state of charge ($SOC_{RH}$) and the accumulated charge $Q_{Accum}$, as shown in Eq. (2):

$$\text{Capacity Estimation} = Q_{Accum}/(SOC_{RH} - SOC_{RL}) \quad \text{Eq. (2)}$$

After the battery capacity is estimated, the method proceeds to box 338, where the method ends.

In various embodiments, the processor can send a signal indicative of a state of health or state of charge of the battery to a display viewable by a driver or operator once the calculation is completed. In an alternative embodiment, the processor can run a diagnostic test on the battery or on the vehicle based on the calculated capacity. In an alternative embodiment, the processor can calculate a state of charge for the battery based on the estimated capacity. In an alternative embodiment, the processor can display a signal to the driver indicating a need for repair or maintenance.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of calculating a capacity of a battery of a vehicle, comprising:
    depleting the battery to reach a target low state of charge during operation of the vehicle;
    resting the battery for a first rest period after the battery reaches the target low state of charge;
    determining a resting low state of charge after the first rest period;
    charging the battery to reach a target high state of charge during operation of the vehicle;
    resting the battery for a second rest period after the battery reaches the target high state of charge;
    determining a resting high state of charge after the second rest period; and
    calculating a capacity of the battery from the resting low state of charge and the resting high state of charge;
    wherein the capacity of the battery is calculated based on a variance in values in a previous update being greater than a variance criterion.

2. The method of claim 1, further comprising measuring an accumulated charge on the battery while charging the battery and calculating the capacity of the battery from the resting low state of charge, the resting high state of charge and the accumulated charge.

3. The method of claim 1, wherein the target low state of charge is at a low end of an operating range of the battery and the target high state of charge is at a high end of the operating range.

4. The method of claim 1, further comprising at least one of: (i) measuring a first voltage of the battery after the first rest period and determining the resting low state of charge from the first voltage; and (ii) measuring a second voltage of the battery after the second rest period and determining the resting high state of charge from the second voltage.

5. The method of claim 1, wherein determining at least one of the resting low state of charge and the resting high state of charge further comprises one of: (i) using a lookup table that relates state of charge to voltage; and (ii) using a model equation that relates state of charge to voltage.

6. The method of claim 1, further comprising at least one of: (i) running a diagnostic test on the battery based on the capacity; (ii) calculating a state of charge for the battery based on the capacity; and (iii) sending a signal indicative of a state of health of the battery.

7. The method of claim 1, wherein the target low state of charge is 30% of a battery charge capacity and the target high state of charge is 70% of the battery charge capacity.

8. A system for calculating a capacity of a battery of a vehicle, comprising:
    a processor configured to:
        operate the vehicle to deplete the battery to reach a target low state of charge;
        measure a resting low state of charge after allowing the battery to rest for a first rest period after the battery reaches the target low state of charge;
        operate the vehicle to charge the battery to reach a target high state of charge;
        measure a resting high state of charge after allowing the batter to rest for a second rest period after the battery reaches the target high state of charge; and
        calculate the capacity of the battery from the resting low state of charge and the resting high state of charge;

wherein the processor calculates the capacity of the battery based on a variance in values in a previous update being greater than a variance criterion.

9. The system of claim 8, wherein the processor is further configured to measure an accumulated charge on the battery while charging the battery and calculate the capacity of the battery from the resting low state of charge, the resting high state of charge and the accumulated charge.

10. The system of claim 8, wherein the processor is configured to set the target low state of charge at a low end of an operating range of the battery and set the target high state of charge at a high end of the operating range.

11. The system of claim 8, wherein the processor is further configured to perform at least one of: (i) measuring a first voltage of the battery after the first rest period and determining the resting low state of charge from the first voltage; and (ii) measuring a second voltage of the battery after the second rest period and determining the resting high state of charge from the second voltage.

12. The system of claim 8, wherein the processor is further configured to determine at least one of the resting low state of charge and the resting high state of charge using one of: (i) a lookup table that relates state of charge to voltage; and (ii) a model equation that relates state of charge to voltage.

13. The system of claim 8, wherein the processor is further configured to perform at least one of: (i) running a diagnostic test on the battery based on the capacity; (ii) calculating a state of charge for the battery based on the capacity; and (iii) sending a signal indicative of a state of health of the battery to an operator.

14. The system of claim 8, wherein the target low state of charge is 30% of a battery charge capacity and the target high state of charge is 70% of the battery charge capacity.

15. A vehicle, comprising:
a battery; and
a processor configured to:
operate the vehicle to deplete the battery to reach a target low state of charge;
measure a resting low state of charge after allowing the battery to rest for a first rest period after the battery reaches the target low state of charge;
operate the vehicle to charge the battery to reach a target high state of charge;
measure a resting high state of charge after allowing the battery to rest for a second rest period after the battery reaches the target high state of charge; and
calculate a capacity of the battery from the resting low state of charge and the resting high state of charge;
wherein the processor calculates the capacity of the battery based on a variance in values in a previous update being greater than a variance criterion.

16. The vehicle of claim 15, wherein the processor is further configured to measure an accumulated charge on the battery while charging the battery and calculate the capacity of the battery from the resting low state of charge, the resting high state of charge and the accumulated charge.

17. The vehicle of claim 15, wherein the processor is configured to set the target low state of charge at a low end of an operating range of the battery and set the target high state of charge at a high end of the operating range.

18. The vehicle of claim 15, wherein the processor is further configured to perform at least one of: (i) measuring a first voltage of the battery after the first rest period and determining the resting low state of charge from the first voltage; and (ii) measuring a second voltage of the battery after the second rest period and determining the resting high state of charge from the second voltage.

19. The vehicle of claim 15, wherein the processor is further configured to determine at least one of the resting low state of charge and the resting high state of charge using one of: (i) a lookup table that relates state of charge to voltage; and (ii) a model equation that relates state of charge to voltage.

20. The vehicle of claim 15, wherein the target low state of charge is 30% of a battery charge capacity and the target high state of charge is 70% of the battery charge capacity.

* * * * *